Feb. 17, 1948.  A. A. KOLLMAN  2,436,109
FISHING BAIT HOLDER
Filed Sept. 20, 1946

INVENTOR.
ALEXANDER A. KOLLMAN

Patented Feb. 17, 1948

2,436,109

UNITED STATES PATENT OFFICE 2,436,109

FISHING BAIT HOLDER

Alexander A. Kollman, Los Angeles, Calif.

Application September 20, 1946, Serial No. 698,282

2 Claims. (Cl. 224—5)

This invention relates to a bait holder and has relation particularly to a device of this kind for carrying live worms in moist packed earth.

In carrying live worms for bait, it is customary to pack them in moist earth to preserve their active life and from which they are withdrawn when needed. The worms will bury themselves at the greatest depth possible and it is ordinarily difficult to extract the worms without complete disruption of the earth, so they may be removed by digging out with the fingers from the bottom of the holder.

The primary object of my invention is to provide an improved bait holder wherein live worms may be kept without injury and to make possible the removal of all worms without unnecessary digging.

Another object is to provide a simply constructed bait holder that may be carried with ease on a fisherman's belt or the like and be accessible at all times for the easy removal of live worms by providing opposed openings having spring loaded lids thereover and having means for rotating and locking the holder so one or the other of said openings will be upright in position.

Another object is to provide a bait holder that is light in weight, can be conveniently carried, and which makes the bait accessible at all times and which requires minimum effort to keep the worms moist and healthy.

Other objects and advantages will become apparent from the following description and the appended claims, reference being had to the accompanying drawings wherein:

Figure 3 is a view in end elevation, the opposite ends being similar.

In the embodiment of the invention as illustrated in the accompanying drawings, the bait holder comprises a body B of desired dimensions and preferably oblong and has its side walls 10 and end walls 10' of such height as may be desired.

Figure 1:
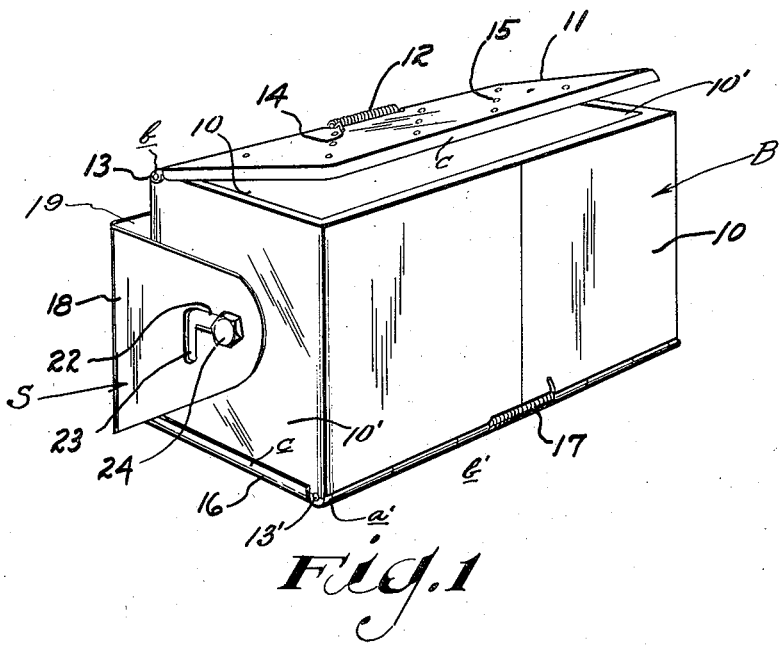
Figure 1 is a view in perspective of a bait holder constructed in accordance with an embodiment of the invention, one of the lids being in partly raised position.
Figure 2:
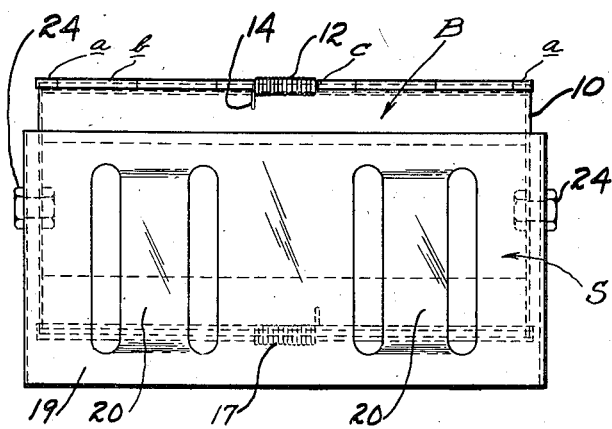
Figure 2 is a view in rear elevation of the holder as illustrated in Figure 1.
Figure 3:
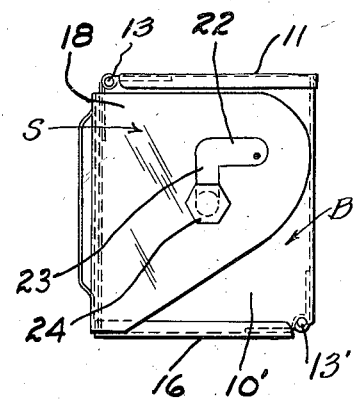

The top and bottom faces of the body B are open, and closing one of such faces is a lid 11, the opposed face being closed by the lid 16. A longitudinal marginal portion of the lid 11 is provided therealong with the spaced knuckles $a$ which mesh between the knuckles $b$ along the adjacent marginal portion of a side wall 10 and insertable through these knuckles $a$ and $b$ is a pivot pin 13. The central knuckle $b$ is cut away as at $c$ to allow the winding on the pin 13 of a coil spring 12 provided at its extremities with the extensions 14, one of which is illustrated in Figure 2, bearing against the adjacent side face of the body B while the second extension bears down upon the lid 11. This mounting of the spring 12 results in maintaining the lid 11 normally in closed position and when the lid is opened and released this spring automatically returns the lid to such closed position.

The lid 16 associated with the opposed open face of the body B is hingedly connected by a pintle 13' disposed through the interlocking knuckles $a'$ and $b'$ carried by a longitudinal margin of the second side wall 10 and the adjacent longitudinal margin of the lid 16. The side wall 10 with which the lid 16 is hingedly connected is opposed to the side wall 10 to which the lid 11 is hingedly connected, whereby the lids 11 and 16 are disposed in opposite directions and in such directions that when the lid 11 or the lid 16 is uppermost, the free longitudinal margin of such lid will be forwardly disposed so as to be readily engaged by the user for raising.

The lids 11 and 16 may be of any preferred form, but as herein disclosed, the free longitudinal and end margins thereof are defined by depending lips or flanges. The central portion of the pivot pin 13' carries the coil spring 17 coacting with the lid 16 and the adjacent side wall 10 in the same manner as hereinbefore set forth with respect to the spring 12.

The body B is of a length to substantially bridge the space between the arms 18 carried by the extremities of the intermediate member 19 of a supporting bracket S. This intermediate member 19 is relatively wide and at its opposite end portions has pressed upwardly therefrom the loop members 20 through which a belt or kindred waist-encircling member is adapted to be threaded so that the bait holder as a unit may be readily and conveniently carried by the person.

Each of the arms 18 of the supporting bracket S is provided in its outer portion with a horizontally disposed slot 22 of desired length and which has its inner extremity continued by a depending slot 23 substantially at right angles therefrom. Each of the end walls 10' of the body B at substantially the axial center thereof, carries an outstanding pintle pin 24 which extends out through either slot 22 or 23.

The inner ends of the slots 22 and the depending slots 23 are spaced outwardly from the intermediate member 19 of the bracket S a distance so that when the body B is shifted rearwardly of the slots 22 to allow the pivot pin 24 to drop down into the slots 23, the inner side wall 10 of the body B will be in such close proximity to the intermediate member 19 as to hold the body B against rotation, at which time either one of the open faces of the body B is upwardly disposed.

The height of the side walls 10 is such, as compared with the distance between either and the member 19, when such walls are vertical, that the securement of the body B is easily accomplished by causing the pins 24 to drop down into the slots 23 when either of the open faces is uppermost.

The body B is adapted to be substantially filled with live worms and moist earth and normally the body B is held against rotation by having the pins 24 within the slots 23. When the worms are concentrated at the bottom of the body B, said body B is raised so that the pins 24 may travel forwardly of the slots 22 as the body B is pulled outwardly, whereupon the body B is given a one-half revolution to invert the same, bringing the live worms uppermost. The body B is then moved rearwardly of the slots 22 and the pins 24 allowed to drop down into the slots 23 to lock the body B so that the body B by contact with the intermediate member 19 of the bracket S will be held against rotation.

Each of the slots 23 is preferably of a width substantially equal to the diameter of the portion of the pin 24 received therein while the slot 22 is preferably of a greater width. This is found to materially facilitate the desired adjustment of the body B into or from locked position.

From the foregoing description it is thought to be obvious that a bait holder constructed in accordance with my invention is particularly well adapted for use by reason of the convenience and facility with which it may be assembled and operated.

I claim:

1. A holder of the character stated, comprising a body having two opposite sides open and including side walls and end walls, closure members for the open sides, supporting means for the body comprising a bracket including an intermediate member and outstanding spaced arms between which the body is disposed, said arms each being provided with a slot having a horizontally disposed portion and a depending angularly disposed portion, and pivot pins carried by the end walls of the body and each slidably engaged in a slot, the depending portions of the slots being spaced from the intermediate member of the bracket a distance to bring the inner side wall of the body closely adjacent to the intermediate member of the bracket when the pivot pins are within the said depending portions of the slots, whereby the body member is held against rotation, said body member when the pins are in the forward ends of the horizontally disposed portions of the slots being free to rotate.

2. A holder of the character stated, comprising a body having two opposite sides open and including side walls and end walls, closure members for the open sides, supporting means for the body comprising a bracket including an intermediate member and outstanding spaced arms between which the body is disposed, said arms each being provided with a slot having a horizontally disposed portion and a depending right angularly disposed portion, and pivot pins carried by the end walls of the body and each slidably engaged in a slot, the depending portions of the slots being spaced from the intermediate member of the bracket a distance to bring the inner side wall of the body closely adjacent to the intermediate member of the bracket when the pivot pins are within the said depending portions of the slots, whereby the body member is held against rotation, said body member when the pins are in the forward ends of the horizontally disposed portions of the slots being free to rotate, the intermediate member of the bracket being provided with means to permit the bracket to be mounted upon a waist-encircling member or the like.

ALEXANDER A. KOLLMAN.

REFERENCES CITED

The following references are of record in the file of this patent:

UNITED STATES PATENTS

| Number | Name | Date |
| --- | --- | --- |
| 220,499 | Seymour | Oct. 14, 1879 |
| 475,977 | Dillingham | May 31, 1892 |